United States Patent Office

3,775,296
Patented Nov. 27, 1973

3,775,296
TREATING TAR SANDS
Michael C. Chervenak, Pennington, and Ronald H. Wolk, Trenton, N.J., assignors to Hydrocarbon Research, Inc., New York, N.Y.
Filed Mar. 20, 1972, Ser. No. 235,918
Int. Cl. C10g 13/02
U.S. Cl. 208—108          2 Claims

ABSTRACT OF THE DISCLOSURE

The degree of hydrogenation of bitumen derived from tar sands obtained in an upflow liquid phase reactor in which a hydrocracking reaction is being carried out for the production of an upgraded synthetic petroleum stock is a function of the amount of naturally occurring solids component in the tar sands. In some cases a supplemental catalyst is required to assure adequate hydrogenation and avoidance of coke in the reactor.

BACKGROUND OF THE INVENTION

U.S. Pat. No. 3,151,054 noted that while the hydrogenation of tar sands is not entirely understood, it appeared that under the operating conditions reported that there was an unexpectedly high consumption of hydrogen. This was apparently due to the presence, in the sand contaminating the bitumen obtained from tar sands, of an iron component that not only acted as a hydrogenation catalyst but also reacted as a desulfurization catalyst. It was considered that the tendency of these solids to act as a catalyst made any other catalyst or contact material in the reactor unnecessary.

The bitumen treated had as much as 2 percent of silt, inorganic sand or the like.

It was noted that the solids were concentrated from ten to twenty times as much as in the feed before an equilibrium concentration was reached in the reactor. In one case the feed contained 1.5 percent of silt and after some hours of operation, the concentration of the accumulated solids amounted to approximately forty percent. Ebullated bed operations under such conditions were uniformly successful.

The accumulation of solids in the reactor may be due to the fact that the sand particles in the feed have a wide particle size distribution, ranging from less than 5 microns to more than 50 microns. There is a tendency for the larger solids to remain in the reactor while the smaller ones are carried out. Alternately, there may be some tendency for particles to agglomerate due to absorption of large oil molecules which may tend to be sticky. The hydrocracking reaction may contribute to the tendency of the particles to concentrate in the reactor, since the viscosity and density of the reactor liquid is much lower than the feed.

SUMMARY OF THE INVENTION

In the hydrocracking of bitumen obtained from the tar sands by the upflow liquid phase ebullated bed process, it has been found that the hydrogen content of the heavy oil product (that fraction boiling above 975° F.) is related to the coke forming tendency of the reactor liquid. If the hydrogen content of this material falls below about 6.8 weight percent, coke is deposited in the reactor. This becomes difficult to maintain at conversion levels exceeding 60 volume percent disappearance of the 975° F.+ feed. With bitumens that have been pre-treated to have less than 1 percent sand initially, the natural build up of sand in the reactor is slow and the catalytic activity required to maintain the hydrogen content of the 975° F.+ product at the desired level takes a long time to achieve. Therefore, the amount of hydrocracking or conversion that can be achieved without coking is limited by the hydrogenation activity available in the reactor.

For such tar sand stock, it is now discovered that an appropriate hydrogenation catalyst can be added during the initial period of operation, with such catalyst addition being reduced or omitted during the later operating period. It is particularly appropriate to provide this external catalytic action at the time of reactor start-up, either initially, or following a unit upset in which the amount of solids present in the reactor would be substantially reduced, so that the catalytic activity of the reactor would be reduced below the minimum required to depress coking.

DRAWINGS

DESCRIPTION OF THE PREFERRED EMBODIMENT

Figure 1:
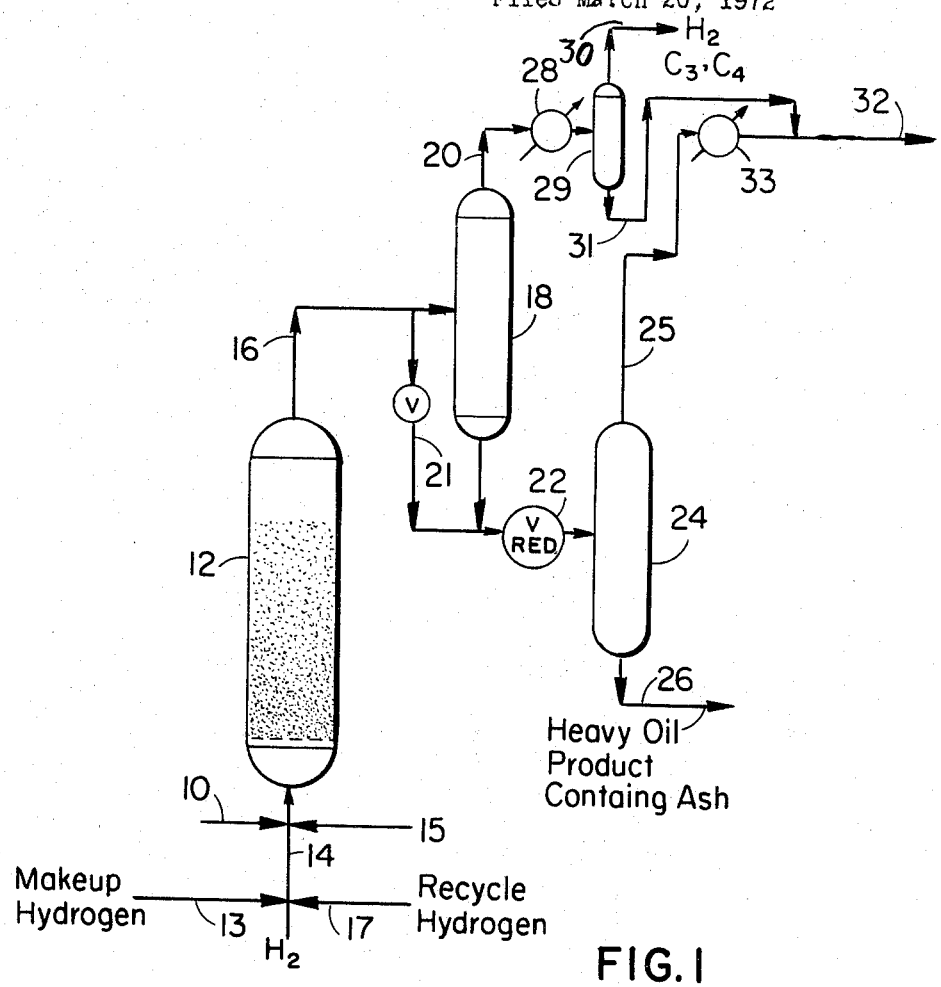
FIG. 1 is a schematic flow diagram of a single stage bitumen hydrocracking process.

As more particularly shown in FIG. 1, a water washed and preheated natural tar including from 0.5 to 10 percent of silt, inorganic sand or the like, the particles of which are generally less than 325 mesh in size is introduced through line 10 to a reactor 12. A hydrogen rich gas (more than 60 percent hydrogen) may be introduced directly to the charge through line 14.

The reactor 12 is preferably a tall, relatively small diameter unit (with a L/D ratio of at least 4 for example). Hydrogenation catalyst may be added through line 15. Conveniently all of the liquid with ash is taken overhead in line 16 and fed to the separator chamber 18. In this chamber 18 there will be a phase separation of gas which is removed overhead by line 20 and the liquid and ash which will be removed as bottoms. Some of the liquid from line 16 may bypass separator chamber 18 through valved line 21 and the liquid then passed through pressure reducing valve 22 to the settling chamber 24. It is also possible to carry out the separation in the top section of reactor 12 and withdrawing separate vapor and liquid streams from the reactor.

This chamber 24 is preferably operated at essentially atmospheric pressure to permit further gas removal at 25, with the heavy oil containing the ash being removed at 26.

The vapors and gases that pass overhead at 20 from the high pressure chamber 18 may be cooled at 28 and passed to separator 29, from which the gases such as hydrogen, methane, etc. may be removed through overhead line 30. A substantial part of this stream is recycled after purification and is injected through line 17 into line 14. Fresh hydrogen enters through line 13.

The liquid fraction removed at 31 as bottoms from separator 29 will be passed to a distillate treating line 32 for further treating, removal of sulfur, etc. In a similar manner the vapors and gases in line 25 from the low pressure separator 24 may be cooled at 33 and similarly passed to line 32.

Under normal conditions, it is found that the pressure in reactor 12 should be in the range of about 400 to 2000 p.s.i.g. and with a hydrogen partial pressure of from 200 to 1600 p.s.i.g. Temperatures will range from at least 600° F. not to exceed about 950° F. Hydrogen consumption is in the range of 200 to 1500 s.c.f./bbl.

The hydrogenation of tar sands is not entirely understood but it appears that the tar can be heated to a much higher temperature in the presence of hydrogen without excessive carbon formation than a similar material can be heated without hydrogen.

With an Athabasca tar sand having 2.7 weight percent solids, it was determined that hydrogenation to the extent of 75 percent conversion of 975° F. plus material to material boiling below 975° F. could be carried out effectively and continuously without the addition of external catalyst.

However, with an Athabasca tar sand as hereinafter described, containing less than one percent of solids and having been previously washed, the solids were not only smaller but the required build up period was exceedingly long. It was established that a 75 percent conversion was impractical except after very extensive operations at a very low conversion.

This not only proved uneconomical during the start-up period, but would have to be repeated at each restart of the process or following any operational upset that tended to reduce the amount of solids in the reactor.

Figure 2:
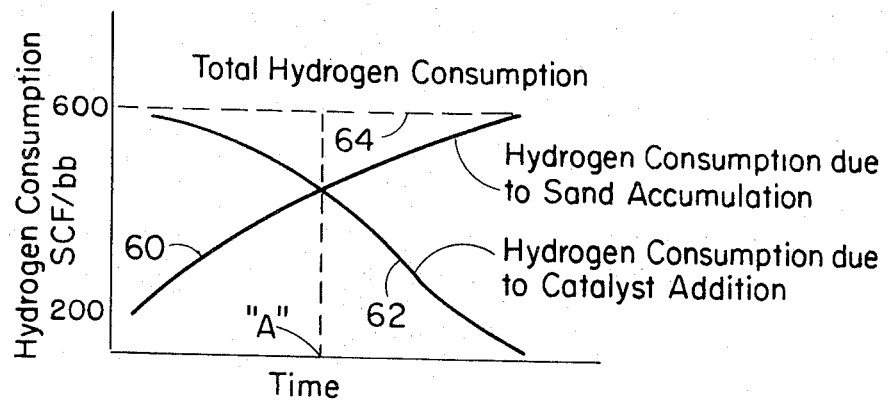
FIG. 2 is a graph generally showing the rate of hydrogen consumption at different time periods in such a bitumen treating process.

Diagrammatically this situation is illustrated in FIG. 2, in which curve No. 60 is a typical hydrogen consumption curve without the addition of catalyst for a constant conversion operation.

At the initial part of the run the low catalytic activity of the reactor resulted in a low hydrogen consumption. The low hydrogen consumption reflected by high values of the HS&W number (heptane insoluble and water). It has been established that high HS&W number means that coke is being deposited within the reactor.

Until the time that a minimum effective hydrogen consumption is reached, due to the slow solids build-up in the reactor, coke formation is taking place.

The invention contemplates an addition of catalyst to the reactor as generally shown by the curve 62 for a minimum time period to establish a total optimum hydrogen consumption as shown by the curve 64. The amount of catalyst added is decreased as the sands build up in the reactor.

It will be apparent from FIG. 2 that by introducing catalyst of a hydrogenation character, such as cobalt-molybdate on alumina, there will be a period of total catalytic effect of the solids, thereby establishing a relatively continuous non-coking environment within the reactor.

EXAMPLES OF ATHABASCA TAR SANDS

|  | A | B |
| --- | --- | --- |
| Carbon, percent | 83.7 | 81.50 |
| Hydrogen, percent | 10.99 | 10.11 |
| Solids, wt. percent | 0.7 | 2.7–4.1 |
| °API | 9.0 | 6.3 |
| Sulfur, wt. percent | 4.5–4.8 | 4.6 |

Preferred operating conditions for treating bitumen feed is to operate at a hydrogen partial pressure 750–1200 p.s.i.g., temperature of 825–850° F., and space velocity of 1.5–1.7 $V_f/hr./V_r$. It was found that processing tar feed "B" at the conditions listed below:

840° F.
750 p.s.i.g. hydrogen partial pressure
1.5 $V_{oil}/hr./V_{reactor}$
3000 s.c.f./bbl. hydrogen circulation that no coking occurred at all in the reactor. However, operating at these same conditions with feed "A," an extensive deposit of coke was found. The hydrogen content of the 975° F.+ product from this operation was 6.2 weight percent. After a period of two weeks, the hydrogen content of the 975° F.+ fraction had increased to 6.8 weight percent. After the two week period, no further coking occurred in the reactor.

Repeating the run, a catalyst addition rate of 0.20 pound of catalyst per barrel of feed bitumen was used at the beginning of the run. The hydrogen content of the 975° F.+ product was found to be 6.8 weight percent. The catalyst addition rate was lowered slowly while maintaining the hydrogen content of the 975° F. product at 6.8 weight percent. This was possible since the sand which contains some catalytic activity was accumulating in the reactor. Over a ten-day period, the catalyst addition rate had been reduced to zero. The reactor was inspected after two weeks on stream and found to contain no coke.

We claim:

1. In a process for refining a bitumen derived from tar sand containing silt in amounts up to 1 percent, said silt having a particle size of the order of smaller than 325 mesh and normally being nonsettling from said tar sand bitumen, at temperatures up to coking temperature, which refining process includes the steps of passing the tar sand bitumen substantially in the liquid phase upwardly through a reaction zone in the presence of a hydrogen-containing gas under temperature in the range of 700 to 950° F. and hydrogen partial pressure in the range of 200 to 1600 p.s.i.g. and space velocity to provide a residence time in the order of one-half hour to about one and one-half hours wherein a hydrogenation catalyst is added to the reaction zone in an amount to establish substantial consumption of hydrogen wherein the addition of catalyst is discontinued when the hydrogen consumption resulting from the accumulated solids reaches the level required to prevent coke formation.

2. In a process for hydrogenating a bitumen having from 0.1 percent to 1 percent of silt which comprises flowing said bitumen at temperatures of at least 600° F. and a hydrogen rich gas upwardly through a reaction zone under a hydrogen partial pressure of at least 200 p.s.i. to minimize coke formation and to hydrogenate the hydrocarbon contaminants in said tar sand bitumen and to render the silt conducive to settling, maintaining a lower portion of said reaction zone whereby the silt concentration in said reaction zone is increased to at least 20 weight percent, removing an equilibrium silt containing tar sand effluent, and settling out the silt therefrom, the improvement wherein a hydrogenation catalyst is added to the reaction zone in an amount to establish substantial consumption of hydrogen and wherein the addition of catalyst is discontinued when the hydrogen consumption resulting from the inert solids concentration reaches equilibrium.

References Cited

UNITED STATES PATENTS

| 3,151,054 | 9/1964 | Layne | 208—11 |
| 3,151,057 | 9/1964 | Shuman et al. | 208—111 |
| 3,556,984 | 1/1971 | Van Driesen | 208—59 |
| 3,617,524 | 11/1971 | Conn | 208—157 |
| 3,630,887 | 12/1971 | Mounce et al. | 208—100 |

DELBERT E. GANTZ, Primary Examiner

G. E. SCHMITKONS, Assistant Examiner

U.S. Cl. X.R.

208—11, 48 R, 112, 143, 157